United States Patent
Choi et al.

[19]

[11] Patent Number: 6,006,335
[45] Date of Patent: Dec. 21, 1999

[54] POWER MANAGEMENT SYSTEM AND METHOD OF DISPLAYING POWER MANAGEMENT INFORMATION IN A COMPUTER

[75] Inventors: Hyeong-Sik Choi; Dong-Ho Lee, both of Kyungki-do, Rep. of Korea

[73] Assignee: SamSung Electronics Co., Ltd., Kyungki-do, Rep. of Korea

[21] Appl. No.: 08/986,683

[22] Filed: Dec. 8, 1997

[30] Foreign Application Priority Data

Dec. 7, 1996 [KR] Rep. of Korea ................. 96-62855

[51] Int. Cl.⁶ ........................................ F01B 21/04
[52] U.S. Cl. .................. 713/310; 713/300; 713/320; 713/322; 713/323; 713/342; 713/330; 713/340
[58] Field of Search .................. 395/750.01, 750.05, 395/750

[56] References Cited

U.S. PATENT DOCUMENTS

| | | | |
|---|---|---|---|
| 5,059,961 | 10/1991 | Cheng | 348/634 |
| 5,163,124 | 11/1992 | Yabe et al. | 364/234.2 |
| 5,335,168 | 8/1994 | Walker | 364/242 |
| 5,375,245 | 12/1994 | Solhjell et al. | 713/321 |
| 5,384,721 | 1/1995 | Joto | 341/26 |
| 5,389,952 | 2/1995 | Kikinis | 348/730 |
| 5,408,668 | 4/1995 | Tornai | 713/324 |
| 5,410,713 | 4/1995 | White et al. | 714/36 |
| 5,481,732 | 1/1996 | Shahbazi | 713/324 |
| 5,483,464 | 1/1996 | Song | 713/323 |
| 5,493,340 | 2/1996 | Kim | 348/569 |
| 5,560,023 | 9/1996 | Crump | 713/310 |
| 5,640,574 | 6/1997 | Kawashima | 713/310 |
| 5,696,978 | 12/1997 | Nishikawa | 713/320 |
| 5,758,172 | 5/1998 | Seo | 713/310 |
| 5,760,636 | 6/1998 | Noble | 327/513 |

OTHER PUBLICATIONS

Microsoft Timeline, http://www.microsoft.com/MSCorp/Museum/timelines/microsoft/timeline.asp, p. 34, Sep. 8, 1994.

Guy R. Newsham and Dale K. Teller, The Energy Consumption of Desktop Computers:Measurement and Savings Potential, p. 2, Jul. 1994.

*Primary Examiner*—Meng-Ai T. An
*Assistant Examiner*—Stacy Whitmore
*Attorney, Agent, or Firm*—Robert E. Bushnell, Esq.

[57] ABSTRACT

A computer system capable of providing a visual display of a display power management signaling (DPMS) mode for user selection of different power save modes of operation. The DPMS mode is used to convert a power supply mode to a power save mode in a computer peripheral such as a monitor. The computer system includes a micro-computer installed in the monitor for determining whether the frequency of sync signals are within predetermined bands to set the power save mode, a switching element installed in the computer for controlling the power supply of a predetermined voltage under control of the micro-computer, and a luminance element installed at a predetermined location of a keyboard and powered by the operation of the switching element for providing a visual display of the DPMS mode for user selection of different power save modes of operation.

18 Claims, 3 Drawing Sheets

POWER MANAGEMENT SYSTEM AND METHOD OF DISPLAYING POWER MANAGEMENT INFORMATION IN A COMPUTER

CLAIM OF PRIORITY

This application makes reference to, incorporates the same herein, and claims all benefits accruing under 35 U.S.C. § 119 from an application for DEVICE FOR AND METHOD OF DISPLAYING DPMS MODE IN COMPUTER SYSTEM earlier filed in the Korean Industrial Property Office on Dec. 7, 1996 and there duly assigned Ser. No. 62855/1996.

BACKGROUND OF THE INVENTION

1. Technical Field

The present invention relates to a computer system capable of displaying a display power management signaling (DPMS) mode and, more particularly, to a power management system device for a method of displaying the DPMS mode in which, when the computer system is not manipulated for a predetermined time, i.e., while not being used, the system converts to a first power save mode, generates a message and waits for user feedback, thus reducing power consumption.

2. Related Art

Contemporary computer systems generally consist of a main unit (which may have built-in storage devices such as floppy disks, hard disks and CD-ROM), a keyboard and a monitor. The main unit may be connected to a printer and other peripheral devices. In normal usage, it is common for the monitor and other peripherals to be turned on and to remain on for as long as the computer is running, even though the peripherals are actually used only a small percentage of the time. A typical color video monitor, for example, may consume as such as 50 to 80 percent of the total 5 electrical energy consumed by a personal computer (PC). If the monitor consumes valuable energy only to remain idle, not only the valuable energy resources will be wasted but the life of the monitor will decrease rapidly. Obviously, power can be conserved if the user turn the computer system off or in a standby mode each time the computer system is no longer in use for an extended period. This requirement is, however, impractical. Therefore, system should be designed to automatically conserve valuable energy resources when the computer system is not in use.

In principle, automatically saving energy by turning off the computer system is fairly easy. Portable computers such as laptop computers are invariably designed so that if there is no activity from the keyboard or from other external inputs during a specified time, the computer systems are turned off or placed in a standby mode to save energy. Only minimal logic is kept active to detect when the keyboard or other external inputs are becoming active again so as to turn the computer system back on. In portable computers, this power saving feature is fairly simple to implement, since the monitor display is integrated with the computer system. However, for normal desktop personal computers in which a monitor is physically separated from the main computer unit, turning off the external monitor automatically from the main computer unit is much more difficult because most monitor systems contain no special lines or special commands to turn the power on or off.

Conventional power saving features for typical personal computers having monitors as separate items are disclosed, for example, in U.S. Pat. No. 5,059,961 for Screen Blanker For A Monitor Of A Computer System issued to Cheng, U.S. Pat. No. 5,163,124 for Method And Apparatus For Controlling Power To Device In A Computer System issued to Yabe et al., U.S. Pat. No. 5,335,168 for Computer System With Power-Down Mode For Monitor issued to Walker, U.S. Pat. No. 5,375,245 for Apparatus For Automatically Reducing The Power Consumption Of A CRT Computer Monitor issued to Solhjell et al., U.S. Pat. No. 5,384,721 for Information Processing System With A Power Control Unit issued to Joto, U.S. Pat. No. 5,389,952 for Low-Power-Consumption Monitor Standby System issued to Kikinis, U.S. Pat. No. 5,408,668 for Method And Apparatus For Controlling The Provision Of Power To Computer Peripherals issued to Tornai, U.S. Pat. No. 5,481,732 for CRT Monitor Power Control Unit issued to Shahbazi, and recent U.S. Pat. No. 5,483,464 for Power Saving Apparatus For Use In Peripheral Equipment Of A Computer issued to Song and assigned to the same assignee of the present invention. Usually, the monitor is shut down during the period of inactivity with the exception of a small amount of power necessary to detect when the computer system becomes active again so as to resume operation of the monitor. Generally, when the monitor is powered normally, the display of data image is blanked during the period of inactivity and re-displayed when the computer system becomes active, i.e., when an input device such as a keyboard is operated. During this type of blanking, however, the monitor continues to consume normal power.

Accordingly, display power management signaling (DPMS) mode standards have been set to save power consumption by controlling monitor power with respect to the operational status of the computer system. In the DPMS mode, power supply is managed according to the operational status of the computer system. The mode status of the power management is classified into ON, STAND-BY, SUSPEND and OFF, which are represented here in operational sequence. The horizontal and vertical sync signals are applied according to the respective power management states as listed in the below table.

| POWER MANAGEMENT STATUS | SYNC SIGNAL | |
| --- | --- | --- |
|  | HORIZONTAL | VERTICAL |
| ON MODE | ○ | ○ |
| STAND-BY MODE | x | ○ |
| SUSPEND MODE | ○ | x |
| OFF MODE | x | x |

In the table "○" indicates the presence of a sync signal, determined as a horizontal sync signal frequency higher than 10 kHz and a vertical sync signal frequency higher than 40 kHz; and "x" indicates that the respective sync signals are below these frequencies and therefore determined to be interrupted. The duty ratio of the sync pulses is assumed less than 25%. When the DPMS mode is activated, however, the monitor is blanked, and may be left powered-on for a long period of time. If the power-off state is incorrectly assumed by the user who leaves the display in an "off" state. This is contrary to the basic function of the power save mode of the computer system which fails to effectively save power.

SUMMARY OF THE INVENTION

Accordingly, it is therefore an object of the present invention to provide a computer system capable of providing a visual display of a display power management signaling (DPMS) mode for user selection.

It is also an object to provide a computer system capable of providing an on-screen display of a display power management signaling (DPMS) mode for user selection of different modes of operation.

These and other objects of the present invention can be achieved by a computer system which comprises a monitor having a controller installed therein for determining different power save modes of operation based on frequencies of synchronization signals and for generating a mode control signal; a computer having a video card installed therein for generating video signals and the synchronization signals, a switching element connected to the video card for controlling power supply of a predetermined voltage in response to the mode control signal; and a luminance element, installed at a predetermined location of a keyboard and powered by the operation of said switching element, for providing a visual display of a display power management signaling (DPMS) mode for user selection of the different power save modes of operation.

Display power management signaling (DPMS) mode is provided to save power through a series of steps of: turning to a power save mode for a predetermined time; generating a message that requests a user to determine whether to convert a current system mode to another mode or not; waiting for the answer for the request in the message; and converting the current system mode to a DOS mode, WINDOW mode, or additional power save mode, according to the answer from the user.

The present invention is more specifically described in the following paragraphs by reference to the drawings attached only by way of example.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
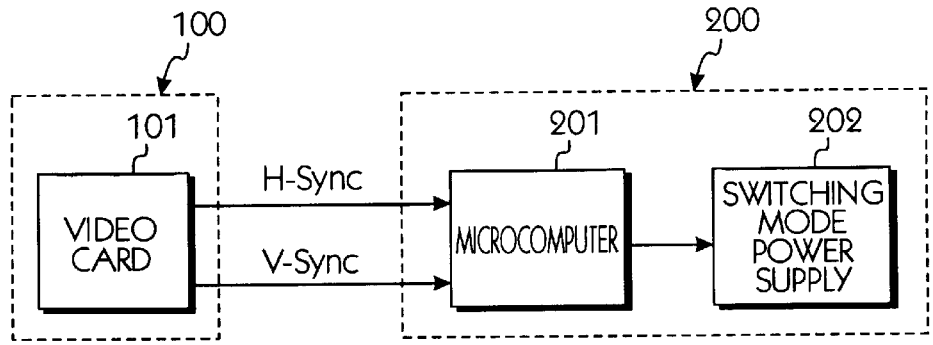
FIG. 1 is a block diagram of a typical computer system for managing power supply of a monitor.

Referring now to the drawings and particularly to FIG. 1, which illustrates a typical computer system for managing power supply of a peripheral device such as a cathode-ray tube (CRT) monitor. The computer system includes a video card 101 installed in a computer 100 for supplying horizontal and vertical sync signals, and a micro-computer 201 for controlling a switching mode power supply 202 installed in a monitor 200 for power management. However, when the DPMS mode is activated, the monitor 200 is blanked, and may be left powered-on for a long period of time. If the power-off state is incorrectly assumed by the user who leaves the display in an "off" state. This is contrary to the basic function of the power save mode of the computer system which fails to effectively save power.

Figure 2:
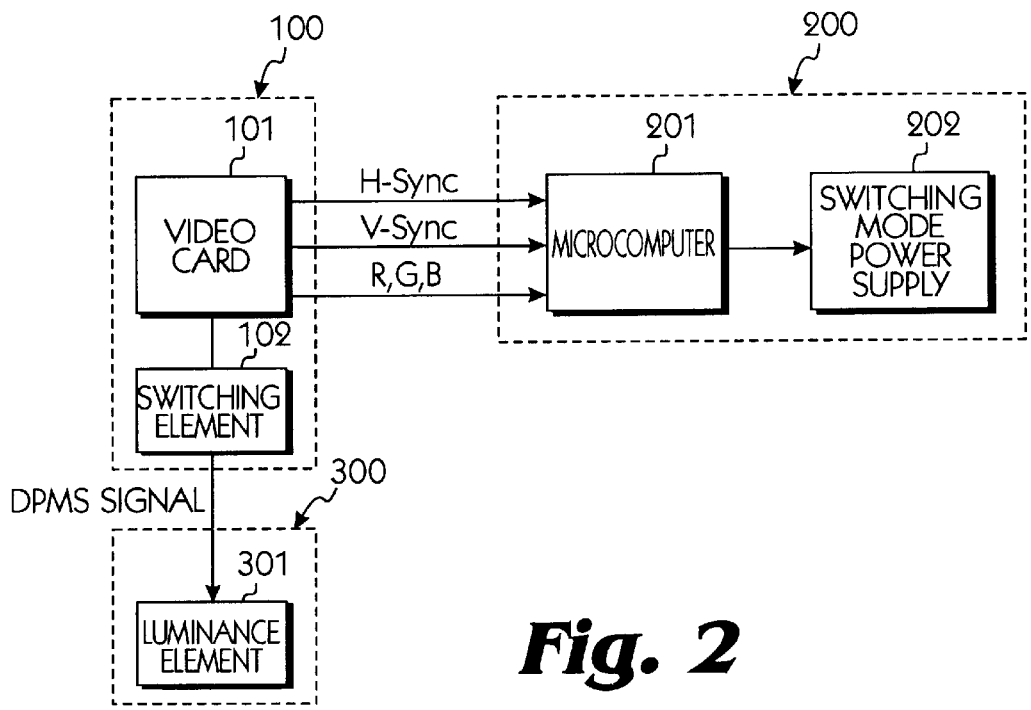
FIG. 2 is a block diagram of a computer system for providing a visual display of a display power management signaling (DPMS) mode for user selection in accordance with one embodiment of the present invention.

Turning now to FIG. 2, which illustrates a computer system for providing a visual display of a display power management signaling (DPMS) mode for user selection in accordance with one embodiment of the present invention. As shown in FIG. 2, the computer system includes a video card 101 installed in a computer 100 for supplying horizontal and vertical sync signals, and a micro-computer 201 for controlling a switching mode power supply 202 installed in a monitor 200 for power management the computer 100. The micro-computer 201 is also installed in the monitor 200 to determine whether the respective frequencies of the horizontal and vertical sync signals supplied from the computer 100 are within predetermined bands in order to set a display power management signaling (DPMS) mode, and generate a DPMS mode control signal in accordance with the set DPMS mode. The computer 100 also includes a switching element 102 for controlling the power supply of a predetermined voltage in accordance with the DPMS mode control signal generated from the micro-computer 201. A luminous element 301, which is installed at a predetermined site on a keyboard 300 and powered by the operation of the switching element 102, for providing a visual display of the DPMS mode for user selection of different modes of operation such as an ON state, a STANDBY state, a SUSPEND state, and an OFF state.

Therefore, in accordance with the executed DPMS mode, the micro-computer 201 generates a STANDBY mode signal to interrupt the horizontal sync signal, a SUSPEND mode signal to interrupt the vertical sync signal, and an OFF mode signal to interrupt both sync signals and thereby set all circuits, excluding the microcomputer, to the power save mode. When the OFF mode signal is sent to the switching element 102, an activation signal is generated for driving the luminous element 301 which is thereby lit according to the state of the switching element 102.

Figure 3:
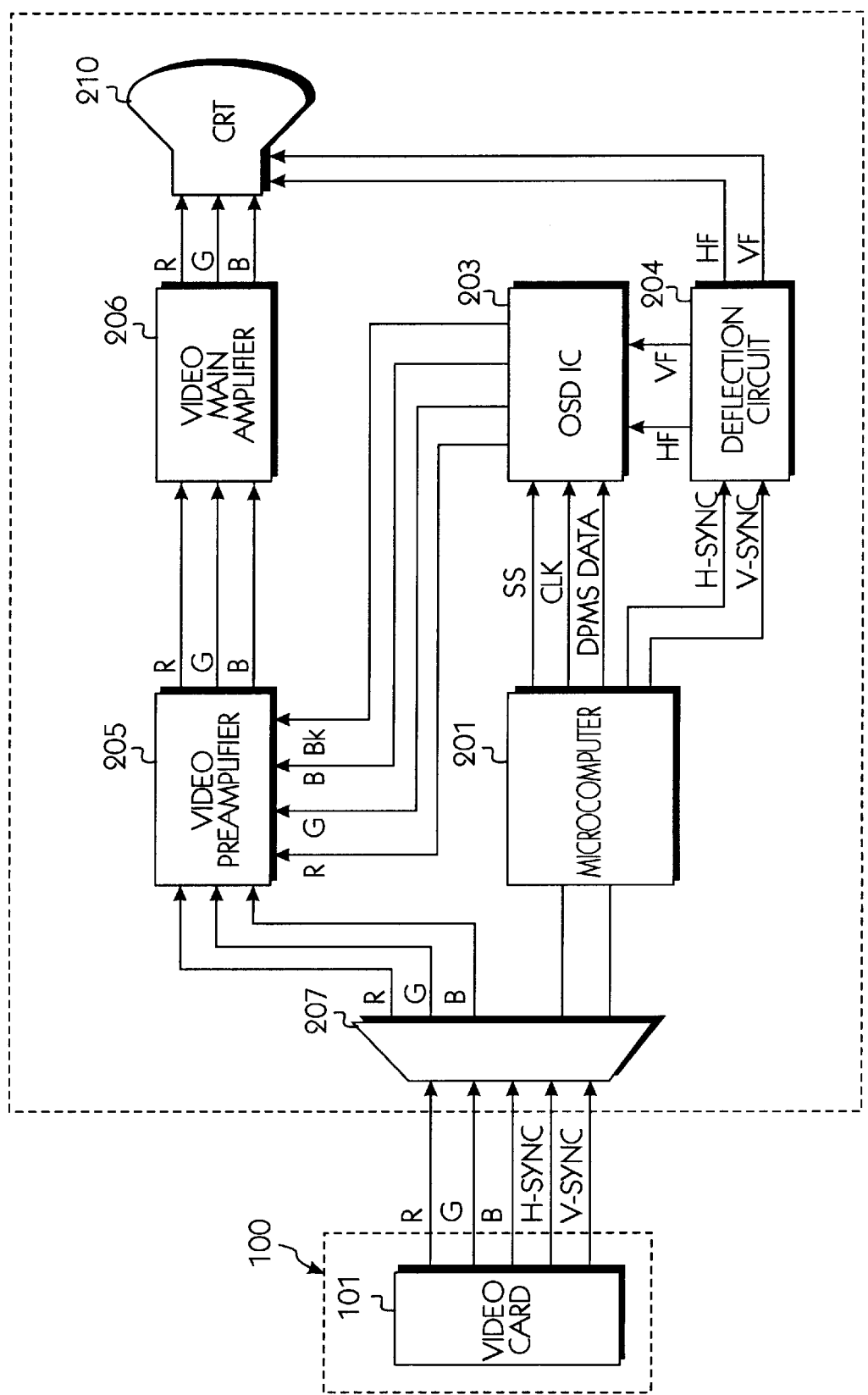
FIG. 3 is a block diagram of a computer system for providing an on-screen display of a display power management signaling (DPMS) mode for user selection in accordance with a second preferred embodiment of the present invention.

The DPMS mode can also be expressed visually using an on-screen display (OSD), as illustrated in FIG. 3. As shown in FIG. 3, the monitor 200 includes an interface circuit 207 which serves to interface with the video card 101 installed in the computer 100 for receiving red (R), green (G), and blue (B) signals and both horizontal and vertical sync signals. A micro-computer 201 receives the R, G, B signals and both the horizontal and vertical sync signals generated from the video card 101 installed in the computer 100 via the interface circuit 207, and generates a DPMS mode control signal and DPMS data to an OSD IC 203 for an on-screen display. A video preamplifier 205 is connected to the interface circuit 207 to amplify the R, G, B signals generated from the video card 101 installed in the computer 100 via the interface circuit 207 to a predetermined level, and mix the R, G, B signals with OSD signals generated from the OSC IC 203 for an on-screen display with the DPMS data. A video main amplifier 206 is connected to the video preamplifier 205 to inversely amplify an output of the video pre-amplifier 205 to a voltage suitable for driving a CRT 210.

Figure 4:
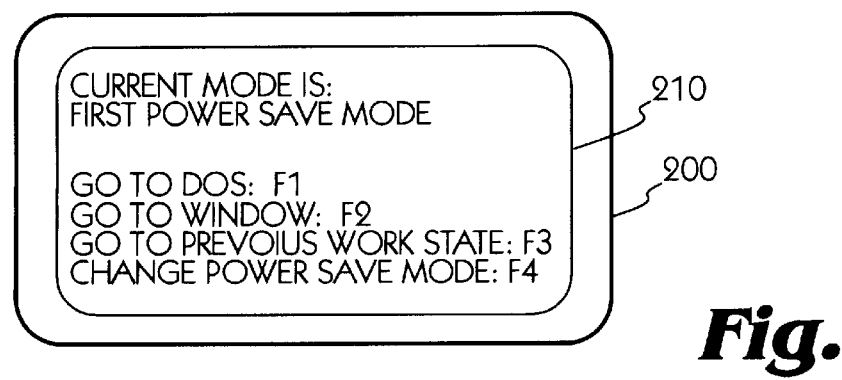
FIG. 4 illustrates a display view of a monitor providing an on-screen display of a display power management signaling (DPMS) mode according to the principles of the present invention.

FIG. 4 includes the CRT 210 of monitor 200. FIG. 4 shows a possible display view of the CRT 210 of monitor 200 wherein the DPMS data is transmitted to the OSD IC 203 of FIG. 3 for an on-screen display of the DPMS mode. In FIG. 4, the CRT monitor 200 provides an on-screen display of the definitions of designated function keys as well as the current DPMS mode. A user can store the displayed information in a memory of the computer 100 of FIG. 3, or display the same on an OSD screen, as desired.

Figure 5:
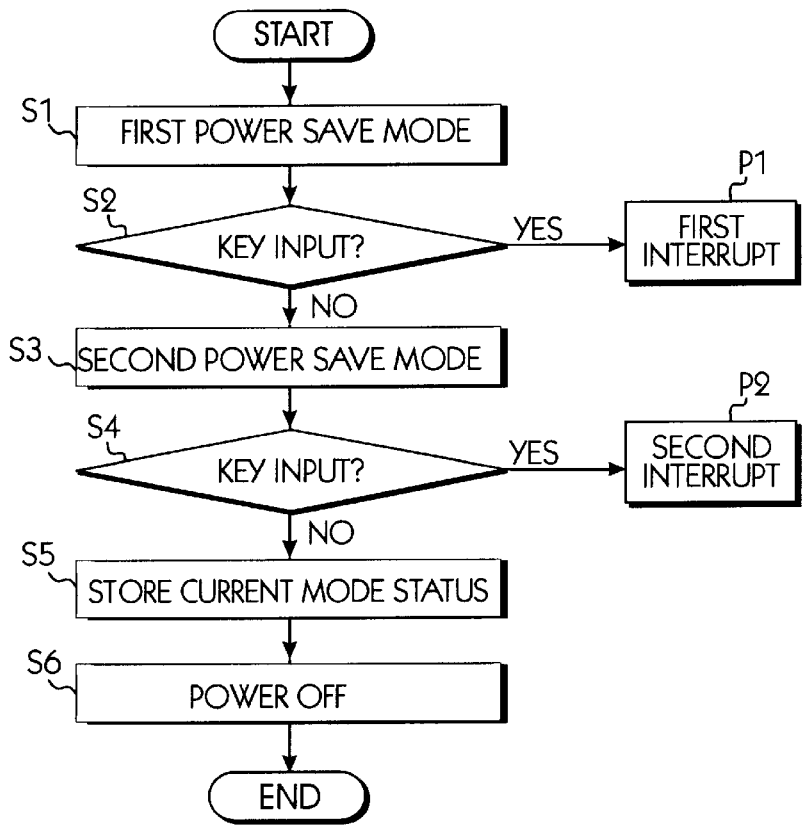
FIG. 5 is a flow chart of a process of displaying a display power management signaling (DPMS) mode in a computer system according to the principles of the present invention.

Refer now to FIG. 5 which illustrates a process of displaying a display power management signaling (DPMS) mode in a computer system according to the principles of the present invention. When the computer 100 detects an interruption or a temporary cessation of user operation, e.g., no keyboard activity for a long period of time, a first power save mode is realized at step S1. The first power save mode is generally a STANDBY mode. When the user presses a key during a predetermined time period, a first interrupt process P1 is executed. Otherwise, in step S2, a control signal for a second power save mode is generated, which, in step S3, changes the power save mode to a SUSPEND mode. If, in step S1, a counter in the second power save mode determines that a key is pressed during a predetermined time period, a second interrupt process P2 is executed. If the key is not pressed during the predetermined time period, the second power save mode is converted into an OFF mode. Upon receipt of an OFF mode control signal, the microcomputer 210 stores the current status of system operation in a non-volatile memory at step S5, and cuts off the power supply at step S6.

When an interrupt signal is generated by a key pressed at steps S2 and S4, one of the first and second interrupt processes P1 and P2 is executed. Interrupt steps P1 and P2 are both illustrated by FIG. 6. The first interrupt process P1 is executed when a key is pressed in the STANDBY mode (no horizontal sync signal). The second interrupt process P2 is executed when a key is pressed in the SUSPEND mode (no vertical sync signal).

The OSD IC 203 of FIG. 3 is controlled by the microcomputer 201 of FIG. 3 to generate an interrupt start signal. The CRT monitor 210 displays a message and menu, such as that shown in FIG. 4. The current DPMS power save mode, i.e., the first or second power save mode, is displayed; and either mode can be selected by pressing a designated function key, such as F1–F4, at step 61 of FIG. 6. The selected function key is recognized at step 62 of FIG. 6.

Figure 6:
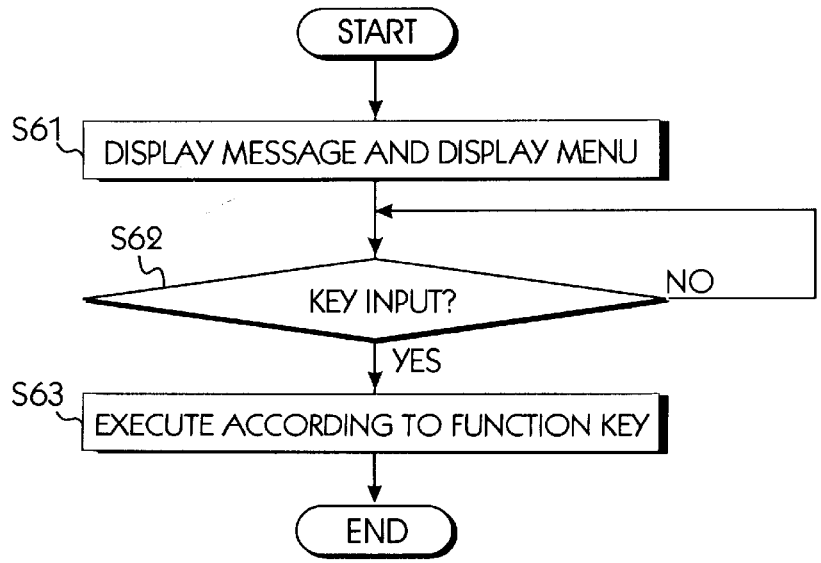
FIG. 6 is a flow chart of each of interrupt processes of FIG. 5.

In step 63 of FIG. 6, the micro-computer 210 executes a program corresponding to the appropriate mode, as selected by predetermined function keys F1–F4. Function key (F1) is used to return the computer system to DOS. Here, the micro-computer 201 generates a control signal to drive the CRT 210 to provide a visual display of information data with a resolution appropriate to the DOS mode. Function key (F2) is used to return the computer system to WINDOW. Here, the micro-computer 201 generates a control signal to drive the CRT 210 to provide a visual display of information data with a resolution appropriate to WINDOW mode. Function key (F3) is used to cancel the power save mode and return to previous work state. Function key (F4) is used to change the power save mode, to increase power saving by converting the current first power save (STANDBY) mode to the second power save (SUSPEND) mode, or to convert the current second power save (SUSPEND) mode to the OFF mode.

If function key (F4) is selected and the second power save mode is converted to the OFF mode, the current status of system operation is stored in an internal memory of the computer system. Then, a power interrupt signal is output to the monitor's power supply, source thereby interrupting both horizontal and vertical sync signals.

As described above, the user can visually recognize the DPMS mode, so that the monitor is not left in a blanked mode for excessively long periods of time. Furthermore, the user can selectively control subsequent operation of the CRT monitor, while simultaneously canceling the DPMS mode.

While there have been illustrated and described what are considered to be preferred embodiments of the present invention, it will be understood by those skilled in the art that various changes and modifications may be made to a display power management signaling (DPMS) mode for a computer system, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system, comprising:

a monitor having a controller installed therein for determining a plurality of different power save modes of operation based on frequencies of synchronization signals and for generating a mode control signal;

a computer having a video card installed therein for generating video signals and said synchronization signals, a switching element connected to the video card for controlling power supply of a predetermined voltage in response to the mode control signal; and a luminous element, installed at a predetermined location of a keyboard and powered by the operation of said switching element, for providing a visual display of a display power management signaling mode for user selection of said plurality of different power save modes of operation, said plurality of different power save modes including at least a power-on mode, a first intermediate power mode, a second intermediate power mode, and a power-off mode, said first intermediate power mode requiring less power than said power-on mode and more power than said second intermediate power mode, said second intermediate power mode requiring more power than said power-off mode, wherein the user is able to select any power save mode from among said plurality of different power save modes.

2. A computer system, comprising:

a computer having a video card installed therein for generating video signals and synchronization signals; and a monitor having a controller installed therein for determining a plurality of different power save modes of operation based on frequencies of said synchronization signals and generating a mode control signal, an on-screen display circuit for providing an on-screen display of a display power management signaling mode in accordance with the video signals generated from the video card for user selection of said plurality of different power save modes of operation, said plurality of different power save modes including at least a power-on mode, a first intermediate power mode, a second intermediate power mode, and a power-off mode, said first intermediate power mode requiring less power than said power-on mode and more power than said second intermediate power save mode, said second intermediate power mode requiring more power than said power-off mode, wherein the user is able to select an power save mode from among said plurality of different power save modes.

3. A method of displaying a display power management signaling mode in a computer system, comprising the steps of:

providing an on-screen display of display power management signaling information while the computer system is in an operating system environment, in response to input of a display power management signaling mode for a predetermined time period, said display power management signaling information including information of a current power save status of the computer system, a first message requesting user's input of a different power save status of the computer system, and a second message requesting user's input of operation instruction to return the computer system to a designated operating system environment;

when the user inputs another power save status of the computer system, changing the current power save status of the computer system to said different power save status; and alternatively, when the user inputs said operation instruction, returning the computer system to said designated operating system environment.

4. The method of claim 3, further comprised of said designated operating system environment corresponding to a DOS environment.

5. The method of claim 3, further comprised of said designated operating system environment corresponding to a WINDOW environment.

6. The computer system of claim 1, wherein said first intermediate power mode comprises a standby mode.

7. The computer system of claim 1, wherein said second intermediate power mode comprises a suspend mode.

8. The computer system of claim 1, wherein a current power save mode of said plurality of different power save modes corresponds to said first intermediate power mode and the user selects said second intermediate power mode to cause said current power save mode to correspond to said second intermediate power mode.

9. The computer system of claim 1, wherein a current power save mode of said plurality of different power save modes corresponds to said second intermediate power mode and the user selects said first intermediate power mode to cause said current power save mode to correspond to said first intermediate power mode.

10. The computer system of claim 2, wherein said first intermediate power mode comprises a standby mode.

11. The computer system of claim 2, wherein said second intermediate power mode comprises a suspend mode.

12. The computer system of claim 2, wherein a current power save mode of said plurality of different power save modes corresponds to said first intermediate power mode and the user selects said second intermediate power mode to cause said current power save mode to correspond to said second intermediate power mode.

13. The computer system of claim 2, wherein a current power save mode of said plurality of different power save modes corresponds to said second intermediate power mode and the user selects said first intermediate power mode to cause said current power save mode to correspond to said first intermediate power mode.

14. The method of claim 3, wherein said different power save status is selected from among a plurality of different power save modes including at least a power-on mode, a first intermediate power mode, a second intermediate power mode, and a power-off mode, said first intermediate power mode requiring less power than said power-on mode and more power than said second intermediate power mode, said second intermediate power mode requiring more power than said power-off mode, wherein the user is able to select any power save mode from among said plurality of different power save modes.

15. The method of claim 14, wherein said first intermediate power mode comprises a standby mode.

16. The method of claim 14, wherein said second intermediate power mode comprises a suspend mode.

17. The method of claim 14, wherein the current power save status of said plurality of different power save modes corresponds to said first intermediate power mode and the user selects said second intermediate power mode to cause the current power save status to correspond to said second intermediate power mode.

18. The method of claim 14, wherein the current power save status of said plurality of different power save modes corresponds to said second intermediate power mode and the user selects said first intermediate power mode to cause the current power save status to correspond to said first intermediate power mode.

* * * * *